US009662845B2

(12) United States Patent
Nakagawa et al.

(10) Patent No.: US 9,662,845 B2
(45) Date of Patent: May 30, 2017

(54) METHOD FOR MANUFACTURING OPTICAL ELEMENT AND DEVICE FOR MANUFACTURING SAME

(71) Applicant: Olympus Corporation, Tokyo (JP)

(72) Inventors: Yusuke Nakagawa, Tokyo (JP); Daigo Hirata, Otsuki (JP); Koji Miyake, Tokyo (JP); Masato Nakahama, Tokyo (JP); Hiroyuki Seki, Tokyo (JP)

(73) Assignee: Olympus Corporation, Tokyo (JP)

( * ) Notice: Subject to any disclaimer, the term of this patent is extended or adjusted under 35 U.S.C. 154(b) by 567 days.

(21) Appl. No.: 14/245,175

(22) Filed: Apr. 4, 2014

(65) Prior Publication Data

US 2014/0217627 A1    Aug. 7, 2014

Related U.S. Application Data

(63) Continuation of application No. PCT/JP2012/079614, filed on Nov. 15, 2012.

(30) Foreign Application Priority Data

Nov. 21, 2011  (JP) ................... 2011-254098

(51) Int. Cl.
  *C03B 11/08*  (2006.01)
  *B29D 11/00*  (2006.01)
  (Continued)

(52) U.S. Cl.
  CPC ............ *B29D 11/00* (2013.01); *B29C 43/021* (2013.01); *B29C 43/34* (2013.01); *C03B 7/14* (2013.01);
  (Continued)

(58) Field of Classification Search
  CPC ......... B29C 43/021; C03B 11/08; C03B 7/14; C03B 11/005; C03B 11/05;
  (Continued)

(56) References Cited

U.S. PATENT DOCUMENTS 5,275,637 A    1/1994  Sato et al.
5,435,818 A *  7/1995  Mashige ................. C03B 11/08
                                          264/1.32

(Continued)

FOREIGN PATENT DOCUMENTS

CN    1621372 A    6/2005
JP    08-133758 A  5/1996
(Continued)

OTHER PUBLICATIONS

Human translation to English of foreign patent application (JP 2010208900A) paragraph [0046]; Spar, Steven; dated Nov. 2, 2016.*

(Continued)

*Primary Examiner* — Matthew Daniels
*Assistant Examiner* — Taryn T Willett
(74) *Attorney, Agent, or Firm* — ArentFox LLP

(57) ABSTRACT

A method for manufacturing an optical element, the method including: heating an optical element material by suspending it in a gas; supplying the heated optical element material from a direction which intersects a central axis interconnecting centers of a first mold and a second mold to a space between molds in a non-contact state, the space between molds being a space between the first mold and the second mold; pressurizing the optical element material supplied to the space between molds by the first mold and the second mold; and cooling the pressurized optical element material.

10 Claims, 12 Drawing Sheets

(51) Int. Cl.
*B29C 43/34* (2006.01)
*C03B 7/14* (2006.01)
*B29C 43/02* (2006.01)
*C03B 40/04* (2006.01)
*G02B 5/04* (2006.01)
*G02B 5/08* (2006.01)
*B29C 35/02* (2006.01)
*G02B 3/00* (2006.01)
*B29C 43/52* (2006.01)
*B29L 11/00* (2006.01)

(52) U.S. Cl.
CPC .............. *C03B 11/08* (2013.01); *C03B 40/04* (2013.01); *B29C 35/0244* (2013.01); *B29C 43/52* (2013.01); *B29C 2043/3461* (2013.01); *B29L 2011/0016* (2013.01); *C03B 2215/47* (2013.01); *C03B 2215/61* (2013.01); *C03B 2215/70* (2013.01); *G02B 3/00* (2013.01); *G02B 5/04* (2013.01); *G02B 5/08* (2013.01)

(58) Field of Classification Search
CPC ............ C03B 2215/61; C03B 2215/71; C03B 2215/80; C03B 2215/70; G02B 3/00
See application file for complete search history.

(56) References Cited

U.S. PATENT DOCUMENTS

| | | | | |
|---|---|---|---|---|
| 5,873,921 | A * | 2/1999 | Hirota | C03B 11/08 65/102 |
| 5,919,718 | A * | 7/1999 | Hirota | C03B 11/08 501/63 |
| 6,009,725 | A | 1/2000 | Hirota et al. | |
| 6,334,335 | B1 * | 1/2002 | Hirota | C03B 11/08 65/102 |
| 6,370,915 | B1 * | 4/2002 | Fujimoto | C03B 7/12 65/122 |
| 6,564,584 | B2 | 5/2003 | Hirota | |
| 9,452,944 | B2 * | 9/2016 | Honji | C03B 11/08 |
| 2003/0154744 | A1 | 8/2003 | Hirota et al. | |
| 2005/0204777 | A1 | 9/2005 | Mori | |
| 2006/0105900 | A1 * | 5/2006 | Kasuga | C03B 11/08 501/78 |
| 2007/0114696 | A1 * | 5/2007 | Miyakoshi | B29C 43/021 264/284 |
| 2010/0242544 | A1 * | 9/2010 | Liao | C03B 11/08 65/286 |
| 2011/0159321 | A1 * | 6/2011 | Eda | G11B 5/8404 428/846.9 |
| 2011/0181961 | A1 * | 7/2011 | Imai | B29C 33/42 359/642 |
| 2013/0042649 | A1 * | 2/2013 | Isono | C03C 19/00 65/61 |
| 2013/0062795 | A1 | 3/2013 | Honji | |
| 2016/0193758 | A1 * | 7/2016 | Fujimoto | B29C 43/58 264/40.5 |

FOREIGN PATENT DOCUMENTS

| | | |
|---|---|---|
| JP | 2007-091586 A | 4/2007 |
| JP | 2007-169131 A | 7/2007 |
| JP | 2009-091202 A | 4/2009 |
| JP | 2010-195012 A | 9/2010 |
| JP | 2010-208900 A | 9/2010 |
| JP | 2010208900 A * | 9/2010 |
| JP | WO-2012/079614 A1 | 11/2011 |

OTHER PUBLICATIONS

International Search Report for PCT/JP2012/079614, mailing date Feb. 26, 2013.

Notice of Rejection Ground of Japanese Patent Application No. 2011-254098 dated Aug. 25, 2015.

Second Office Action mailed Feb. 15, 2016 fro copending Chinese Application No. 201280049760.0 (with English translation).

First Notice of the Opinion on Examination dated Jun. 25, 2015 for co-pending Chinese Patent Application No. 201280049760.0 (partial translation).

U.S. Office Action for U.S. Appl. No. 13/670,709 dated Feb. 24, 2016.

U.S. Office Action for U.S. Appl. No. 13/670,709 dated Sep. 3, 2015.

* cited by examiner

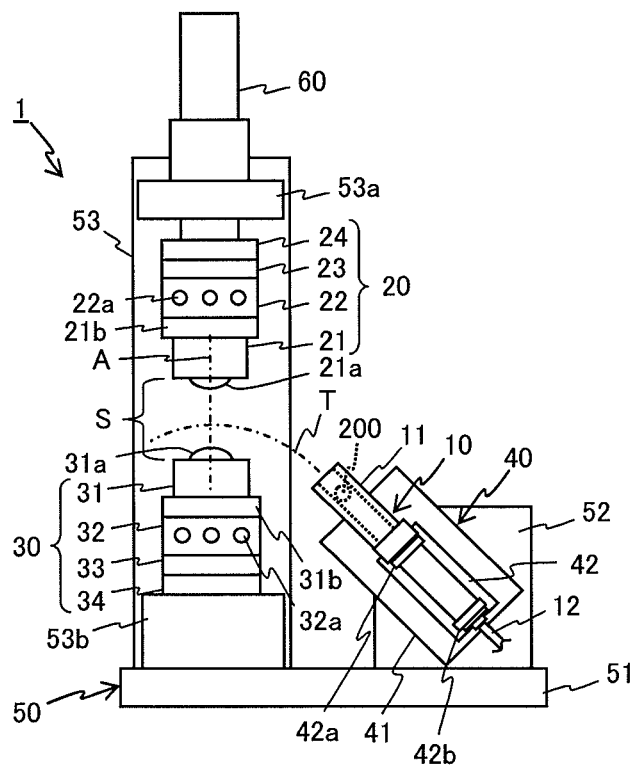
F I G. 1

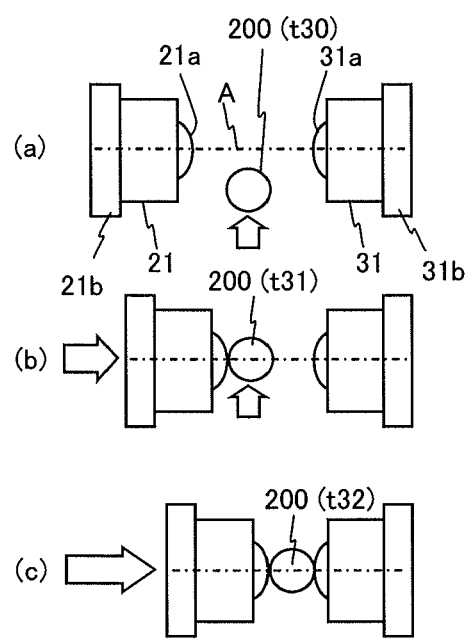
F I G. 9

METHOD FOR MANUFACTURING OPTICAL ELEMENT AND DEVICE FOR MANUFACTURING SAME

CROSS REFERENCE TO RELATED APPLICATIONS

This is Continuation Application of PCT application No. PCT/JP2012/079614, filed Nov. 15, 2012 which was not published under PCT Article 21(2) in English.

This application is based upon and claims the benefit of priority from the prior Japanese Patent Application No. 2011-254098, filed Nov. 21, 2011, the entire contents of which are incorporated herein by reference.

BACKGROUND OF THE INVENTION

Field of the Invention

The present invention is related to a method for manufacturing optical elements such as lenses, prisms, mirrors, and the like, and a device for manufacturing the same.

Description of the Related Art

Conventionally, a method for manufacturing an optical element by pressurizing a heated and softened optical element material, followed by cooling the pressurized optical element material to harden it, is known.

In such a method for manufacturing an optical element, a technology of supplying an optical element material by heating the optical element material by suspending it in a heated gas and dropping it onto an upper surface of a lower mold is disclosed (for example, see Patent Document 1).

The order of steps in a method for manufacturing an optical element of the Patent Document 1 is suspended heating, a drop (supply) from a heating unit onto an upper surface of a lower mold, a retreat of a heating unit, and a descent of an upper mold.

Patent Document 1: Japanese Laid-open Patent Publication No. 8-133758

SUMMARY OF THE INVENTION

A method for manufacturing an optical element according to the present invention includes: heating an optical element material by suspending it in a gas; supplying the heated optical element material from a direction which intersects a central axis interconnecting centers of a first mold and a second mold to a space between molds in a non-contact state, the space between molds being a space between the first mold and the second mold; pressurizing the optical element material supplied to the space between molds by the first mold and the second mold; and cooling the pressurized optical element material.

A device for manufacturing an optical element according to the present invention includes: a heating unit that heats an optical element material by suspending it in a gas; a first mold and a second mold that pressurize the optical element material; and a supply unit that supplies the optical element material from a direction which intersects a central axis interconnecting centers of the first mold and the second mold to a space between molds in a non-contact state, the space between molds being a space between the first mold and the second mold.

BRIEF DESCRIPTION OF THE DRAWINGS

FIG. 1 is a front view which illustrates a device for manufacturing an optical element according to a first embodiment of the present invention.

FIG. 9 is an explanatory diagram (No. 1) for explaining a supplying step and a pressurizing step of an optical element material in a fourth embodiment of the present invention.

DESCRIPTION OF THE PREFERRED EMBODIMENT

Figure 2:
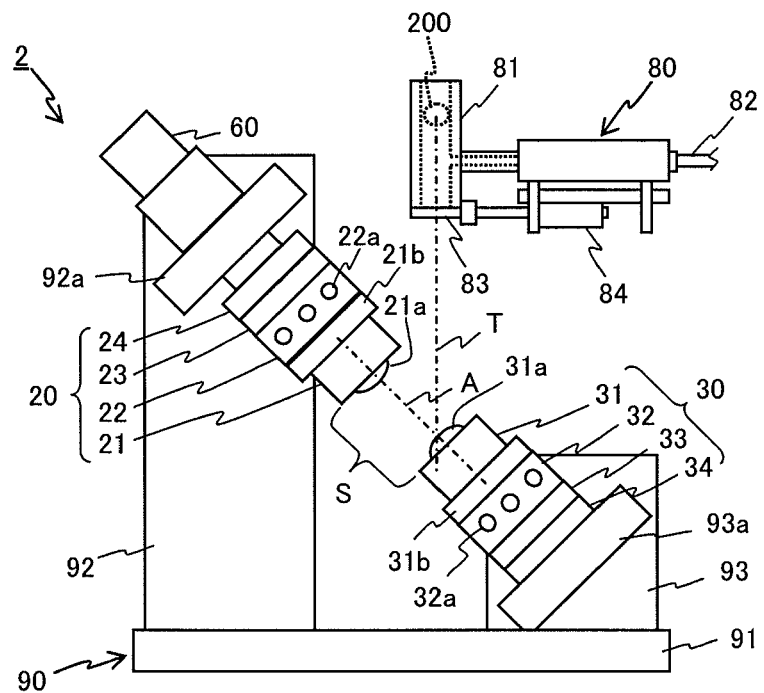
FIG. 2 is a front view which illustrates a device for manufacturing an optical element according to a second embodiment of the present invention.

In a method for manufacturing an optical element as disclosed in the above mentioned Patent Document 1, a time difference occurs from a contact of a lower mold with an optical element material until a contact of an upper mold with an optical element material, or until a commencement of a deformation of the optical element material.

Accordingly, a limit to a temperature of a mold, that is, a molding condition, is brought about, and there is a need to prevent an excessive decrease in a temperature of an optical element material in the above mentioned time difference.

For example, when a temperature of a mold is too low, an optical element material may not be deformed such that it has a desired thickness. Therefore, even though a temperature of a mold that can keep the temperature in which the optical element material is deformable is required, when the temperature of the mold is made high, extra cooling of the mold and the optical element material is further required after a completion of a deformation of the optical element material.

Hereafter, in reference to drawings, explanations are given for a method for manufacturing an optical element and a device for manufacturing the same, according to embodiments of the present invention.

First Embodiment

FIG. 1 is a front view which illustrates a device 1 for manufacturing an optical element according to a first embodiment of the present invention.

As illustrated in FIG. 1, the device 1 for manufacturing an optical element includes a heating unit 10, a movable mold unit 20 having a movable mold 21 which is one example of a first mold, a fixed mold unit 30 having a fixed mold 31 which is one example of a second mold, a heating unit moving mechanism 40, a base unit 50, and a cylinder 60, which is one example of a pressurizing unit. A heating unit 10 also functions as a supply unit which supplies an optical element material 200 to a later-mentioned space S between molds in a non-contact state, by making the optical element material 200 be exposed from the heating unit 10. A non-contact state of the optical element material 200 refers to a state in which no solid members surrounding the optical element material 200 come into contact with the optical element material 200.

The heating unit 10 has a main body 11 having a substantially cylindrical shape and a gas supply pipe 12 which supplies a gas to the main body 11, and the heating unit 10 heats the optical element material 200 inside of the main body 11 by suspending the optical element material 200 in a gas.

The main body 11 consists, for example, of a fused quartz with an inner diameter of 7 mm and is arranged at an inclination angle of 45°, for example, in a perpendicular direction, so that a tip portion is opened obliquely upward. The main body 11 may consist of materials other than a fused quartz so long as it has a heat resistance against a heated temperature of the optical element material 200.

Even though the optical element material 200 is a spherical glass material having a diameter of 6 mm, for example, according to the present embodiment, other materials including a plastic and the like may be used for the optical element material 200, and other shapes may be employed as well.

The gas supply pipe 12 supplies a gas which is supplied from a not-illustrated gas supply unit to the main body 11. The gas supplied to the main body 11 is heated by a not-illustrated electric coil, for example.

An amount of a gas sprayed onto the optical element material 200 may be appropriately determined in accordance with a size and the like of the optical element material 200 and the main body 11, and in the present embodiment, it is 10 L/min. Further, a configuration of the heating unit 10 is not limited to the one disclosed in the present embodiment, so long as the configuration allows for heating the optical element material 200 by suspending it in a gas.

A movable mold unit 20 and a fixed mold unit 30 have a movable mold 21, a fixed mold 31, heating blocks 22 and 32, heat insulation blocks 23 and 33, and base blocks 24 and 34.

The movable mold 21 and the fixed mold 31 respectively have a substantially cylindrical shape, and are arranged in an opposed manner to pressurize the optical element material 200. At centers of the movable mold 21 and the fixed mold 31, for example, convex molding surfaces 21a and 31a are formed. Further, flanges 21b and 31b are formed at a fixed end of the movable mold 21 and the fixed mold 31, the fixed end being a side of heating blocks 22 and 32.

The movable mold 21 is arranged perpendicularly downward and the fixed mold 31 is arranged perpendicularly upward. Accordingly, a central axis A which interconnects centers of the movable mold 21 and the fixed mold 31 extends in a perpendicular direction. The central axis A corresponds to a pressurizing direction of the movable mold 21 and the fixed mold 31.

Into the heating blocks 22 and 32, for example, three cylindrically shaped heaters 22a and 32a are inserted.

The heat insulation blocks 23 and 33 insulate heat of the heating blocks 22 and 32.

The base block 24 of the movable mold unit 20 is provided at an end portion which is opposite to the movable mold 21 in the movable mold unit 20, and the base block 34 of the fixed mold unit 30 is provided at an end portion which is opposite to the fixed mold 31 in the fixed mold unit 30.

The heating unit moving mechanism 40 has a guide plate 41 and a slider 42.

In the guide plate 41, a not-illustrated guide rail is provided which has the same inclination angle as that of the main body 11 of the heating unit 10, for example.

The slider 42 retains the heating unit 10 in the retention units 42a and 42b. Further, the slider 42 migrates with respect to the guide plate 41, being integrated with the heating unit 10.

The base unit 50 has a base 51, a heating unit fixing unit 52, and a mold fixing unit 53.

On the base 51, the heating unit fixing unit 52 and the mold fixing unit 53 are provided with space between each other.

To the heating unit fixing unit 52, the guide plate 41 of the heating unit moving mechanism 40 is fixed.

The mold fixing unit 53 has a cylinder fixing unit 53a to which a cylinder 60 which vertically moves the movable mold unit 20 is fixed, and a fixed mold fixing unit 53b to which the base block 34 of the fixed mold unit 30 is fixed.

Hereafter, explanations are given for a flow of manufacturing an optical element from an optical element material 200, appropriately omitting the explanations for descriptions which overlap with the above explanations.

First, a not-illustrated transportation device inserts the optical element material 200 into the main body 11 of the heating unit 10 from a position obliquely above the main body 11.

In the heating unit 10, a gas to be supplied inside of the main body 11 through the gas supply pipe 12 is heated, and the heated gas is sprayed onto the optical element material 200. Thus, the heating unit 10 heats the optical element material 200 by suspending it in a gas inside of the main body 11 (heating step). "Heating" means to add heat to a state of a room temperature. Accordingly, a temperature of the optical element material 200 may be increased to a temperature that is higher than a room temperature inside of the heating unit 10 in the heating step, by inserting the optical element material 200 into the heating unit 10, the optical element material 200 being in a state of a temperature that is lower than the temperature inside of the heating unit 10 (for example, a state of a room temperature), for example. In addition, a temperature of the optical element material 200 may also be decreased to a temperature that is higher than a room temperature inside of the heating unit 10 in the heating step, by inserting the optical element material 200 into the heating unit 10, the optical element material 200 being in a state of a temperature that is higher than the temperature inside of the heating unit 10, for example. Further, a temperature of the optical element material 200 may also be retained at a temperature that is higher than a room temperature inside of the heating unit 10 in the heating step, by inserting the optical element material 200 into the heating unit 10, the optical element material 200 being in an isothermal state with the temperature inside of the heating unit 10, for example.

The heated optical element material 200 is discharged by being thrown upwardly from the heating unit 10 which is oriented obliquely downward in the present embodiment, a direction which intersects the central axis A of the movable mold 21 and the fixed mold 31, and is supplied to the space S between molds, which is a space between the movable mold 21 and the fixed mold 31, in a non-contact state (supplying step).

In the supplying step, the optical element material 200 is discharged from the heating unit 10 and is supplied to the space S between molds, by increasing a spray amount (flow rate) of a gas which is supplied from the gas supply pipe 12, for example. Alternatively, the optical element material 200 is discharged from the heating unit 10 by inertia and is supplied to the space S between molds, by stopping or decelerating the movement of the slider 42 of the heating unit moving mechanism 40, for example.

When the optical element material 200 is not heated inside of the heating unit 10, that is, when the optical element material 200 which is in a state of being exposed to the outside from the main body 11 is heated in the heating step, it is preferable to supply the optical element material 200 to the space S between molds by spraying a gas.

The optical element material 200 supplied to the space S between molds is pressurized by the movable mold 21 and the fixed mold 31 as the cylinder 60 makes the movable mold unit 20 descend (pressurizing step). With this, a biconcave shape is transferred from the convex molding surfaces 21a and 31a to the optical element material 200.

The pressurizing step includes a first contacting step in which a movable mold 21 (first mold) is brought into contact with the optical element material 200, and a second contacting step in which a fixed mold 31 (second mold) is brought into contact with the optical element material 200 in and after the first contacting step. Here, "after" includes a concurrent status.

In the first contacting step, the optical element material 200 is discharged obliquely upward from the heating unit 10 and comes into contact with the movable mold 21 at a peak of a track T in which the optical element material 200 subsequently falls obliquely downward.

Although detailed explanations are given in the third embodiment, in the first contacting step and the second contacting step, it is preferable that the movable mold 21 and the fixed mold 31 come into contact with the optical element material 200 within a range of an optical effective diameter. Further, it is desirable that the first contacting step and the second contacting step be performed at the same time (within 0.5 second, for example) or substantially the same time (within 2 seconds, for example). The optical effective diameter is positioned inside of the molding surfaces 21a and 31a, is a portion which exhibits optical characteristics (an optical function surface) and is, for example, a whole or a part of the convex portion of the convex molding surfaces 21a and 31a.

The optical element material 200 which was pressurized in the pressurizing step is cooled, maintaining a state of being pressurized and retained until its temperature reaches a glass-transition point or below, for example by decreasing a temperature of heaters 22a and 32a, or by stopping heaters 22a and 33a (cooling step). When a preset temperature of heaters 22a and 32a in the pressurizing step is at or lower than a glass-transition point (for example, 490° C.), the cooling step may be performed without changing the preset temperature. The same applies to following embodiments as well. After the cooling step, the optical element material 200 (manufactured optical element) is carried out from the device 1 for manufacturing an optical element by a not-illustrated carrying-out mechanism. As a result of the above, an optical element is manufactured.

In the first embodiment explained so far above, the method for manufacturing an optical element includes a heating step which heats the optical element material 200 by suspending it in a gas. Further, the method for manufacturing the optical element includes a supplying step which supplies the heated optical element material 200 from a direction which intersects a central axis A which interconnects centers of a movable mold 21 (first mold) and a fixed mold 31 (second mold) to a space S between molds in a non-contact state.

Therefore, the optical element material 200 may be supplied to a space S between molds such that the heating unit 10 does not interfere with the movable mold 21 and the fixed mold 31. With this, an increase in a moving amount of the movable mold 21 and the fixed mold 31 caused by increased space between the movable mold 21 and the fixed mold 31 for reducing the interference with the heating unit 10 may be prevented. Accordingly, a time difference for the movable mold 21 and the fixed mold 31 to come into contact with the optical element material 200 may be approximated as being infinitely close to zero (simultaneous). Therefore, a decrease in a temperature of the optical element material 200 in the above time difference is prevented, and as a result of this, restrictions such as increasing a temperature of the movable mold 21 and the fixed mold 31 beyond that which is necessary are no longer generated in the molding condition.

Therefore, according to the present embodiment, restrictions in a molding condition may be reduced in heating the optical element material 200 by suspending it in a gas and supplying the heated optical element material 200 to the space S between molds.

Further, in the supplying step according to the present embodiment, the optical element material 200 is discharged from the heating unit 10 which is positioned outside of the space S between molds and is supplied to the space S between molds. Accordingly, the optical element material 200 may be supplied from the heating unit 10 which is positioned not to interfere with the movable mold 21 and the fixed mold 31, and the time difference of the contact of the movable mold 21 and the fixed mold 31 with the optical element material 200 may further be shortened.

Further, in the supplying step according to the present embodiment, when the heating unit 10 stops or decelerates in motion, and when the optical element material 200 is discharged from the heating unit 10 by inertia, the optical element material 200 may be supplied easily from the position away from the central axis A of the movable mold 21 and the fixed mold 31. Accordingly, the time difference of the contact of the movable mold 21 and the fixed mold 31 with the optical element material 200 may further be shortened.

Similarly, when the optical element material 200 is discharged from the heating unit 10 by increasing a spray amount (flow rate) of a gas supplied from the gas supply pipe 12 compared with the spray amount in the supplying step, it is possible to supply the optical element material 200 from the position away from the central axis A of the movable mold 21 and the fixed mold 31.

In the present embodiment, although the movable mold 21 is arranged as an example of the first mold and the fixed mold 31 is arranged as an example of the second mold, both molds may be configured as movable molds.

Second Embodiment

FIG. 2 is a front view which illustrates a device 2 for manufacturing an optical element according to a second embodiment of the present invention.

In the present embodiment, explanations are given mainly for matters that are different from the first embodiment, and explanations are appropriately omitted for common matters.

As illustrated in FIG. 2, the device 2 for manufacturing an optical element includes a movable mold unit 20, a fixed mold unit 30, and a cylinder 60, similarly to the first embodiment. Further, the device 2 for manufacturing an optical element includes a heating unit 80 which is different from the heating unit in the first embodiment and a base unit 90. A heating unit 80 of the present embodiment also functions as a supply unit which supplies an optical element material 200 to a space S between molds in a non-contact state, by making the optical element material 200 become exposed from the heating unit 10.

The movable mold 21 is arranged obliquely downward and the fixed mold 31 is arranged obliquely upward. Accordingly, the central axis A which interconnects centers of the movable mold 21 and the fixed mold 31 is oriented in a perpendicular direction. An inclination angle of the movable mold 21 and the fixed mold 31 in a perpendicular direction is 45°, for example.

The heating unit 80 has a main body 81 having a substantially cylindrical shape, and a gas supply pipe 82 which supplies a gas to the main body 81, a shutter 83, and a shutter driving unit 84, and the heating unit 80 heats the optical element material 200 inside of the main body 11 by suspending the optical element material 200 in a gas. In the present embodiment, a heating unit moving mechanism 40 illustrated in FIG. 1 is not arranged.

The main body 81 is arranged so that both ends thereof are opened perpendicularly upward and perpendicularly downward.

The shutter 83 is provided in a lower part of the main body 81, and moves to a position which blocks a lower end of the main body 81 (see FIG. 2) and to a position which opens a lower end of the main body 81 in a supplying step of the optical element material 200, by a shutter driving unit 84, which is for example a cylinder.

The base unit 90 has a base 91, a moving mold side fixing unit 92, and a fixing mold side fixing unit 93.

On the base 91, the moving mold side fixing unit 92 and the fixing mold side fixing unit 93 are provided with space between each other.

The moving mold side fixing unit 92 has a cylinder fixing unit 92a to which a cylinder 60 which moves the movable mold unit 20 is fixed.

The fixing mold side fixing unit 93 has a fixed mold fixing unit 93a to which a base block 34 of the fixed mold unit 30 is fixed.

Hereafter, explanations are given for a flow of manufacturing an optical element from an optical element material 200.

In the heating unit 80, a gas to be supplied inside of the main body 81 through the gas supply pipe 82 is heated, and the heated gas is sprayed onto the optical element material 200. Thus, the heating unit 80 heats the optical element material 200 by suspending it in a gas inside of the main body 81 (heating step).

The heated optical element material 200 falls perpendicularly downward (track T) on a path which intersects a central axis A of the movable mold 21 and the fixed mold 31, as the shutter driving unit 84 moves the shutter 83 to open the lower end of the main body 81, and as a spraying of a gas stops, and the optical element material 200 is supplied to a space S between molds in a non-contact state (supplying step).

The optical element material 200 supplied to the space S between molds is pressurized by the movable mold 21 and the fixed mold 31 as the cylinder 60 moves the movable mold unit 20 obliquely downward (pressurizing step).

The pressurizing step includes a first contacting step in which a fixed mold 31 (first mold) is brought into contact with the optical element material 200, and a second contacting step in which a movable mold 21 (second mold) is brought into contact with the optical element material 200 in and after the first contacting step.

The optical element material 200 which was pressurized in the pressurizing step is cooled, maintaining a state of being pressurized and retained until its temperature reaches a glass-transition point or below, for example by decreasing a temperature of heaters 22a and 32a, or by natural cooling (cooling step). After the cooling step, the optical element material 200 (manufactured optical element) is carried out from the device 1 for manufacturing an optical element by a not-illustrated carrying-out mechanism. As a result of the above, an optical element is manufactured.

In the second embodiment explained so far above, the method for manufacturing the optical element includes a heating step which heats the optical element material 200 by suspending it in a gas. Further, the method for manufacturing the optical element includes a supplying step which supplies the heated optical element material 200 from a direction which intersects a central axis A which interconnects centers of a fixed mold 31 (first mold) and a movable mold 21 (second mold) to a space S between molds in a non-contact state.

Therefore, similarly to the first embodiment, according to the present embodiment, restrictions in a molding condition may be reduced in heating the optical element material 200 by suspending it in a gas and supplying the heated optical element material 200 to the space S between molds.

Further, in the supplying step of the present embodiment, the optical element material 200 is supplied from perpendicularly upward to the space S between molds. Therefore, the optical element material 200 does not move in a horizontal direction and as a result of this, the optical element material 200 may be supplied easily to the space S between molds.

Third Embodiment

Figure 3:
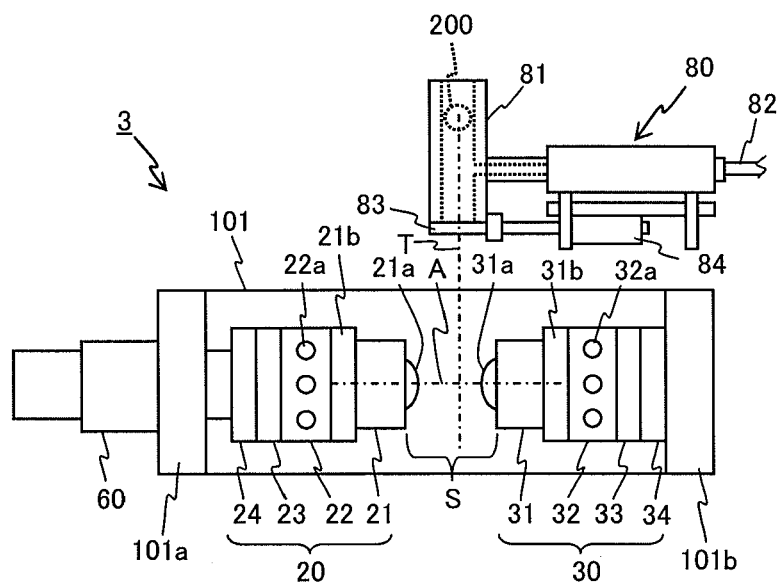
FIG. 3 is a front view which illustrates a device for manufacturing an optical element according to a third embodiment of the present invention.

FIG. 3 is a front view which illustrates a device 3 for manufacturing an optical element according to a third embodiment of the present invention.

In the present embodiment, explanations are given mainly for matters that are different from the first embodiment and the second embodiment, and explanations are appropriately omitted for common matters.

As illustrated in FIG. 3, and similarly to the first embodiment, the device 3 for manufacturing an optical element includes a movable mold unit 20, a fixed mold unit 30, and a cylinder 60. The device 2 for manufacturing an optical element, similarly to the second embodiment, further includes a heating unit 80. The device 2 for manufacturing an optical element also includes a mold fixing unit 101 which is different from that in the first embodiment and second embodiment.

The movable mold 21 and the fixed mold 31 are arranged in an opposed manner in a horizontal direction. Accordingly, a central axis A which interconnects centers of the movable mold 21 and the fixed mold 31 is arranged orthogonally to a perpendicular direction.

The mold fixing unit 101 has a cylinder fixing unit 101a to which a cylinder 60 which horizontally moves the movable mold unit 20 is fixed, and a fixed mold fixing unit 101b to which the base block 34 of the fixed mold unit 30 is fixed.

Next, explanations are given for a flow of manufacturing an optical element from an optical element material 200.

In the heating unit 80, a gas to be supplied inside of the main body 81 through the gas supply pipe 82 is heated, and the heated gas is sprayed onto the optical element material 200. Thus, the heating unit 80 heats the optical element material 200 by suspending it in a gas inside of the main body 81 (heating step).

The heated optical element material 200 falls perpendicularly downward (track T) on a path which intersects a central axis A of the movable mold 21 and the fixed mold 31, as the shutter driving unit 84 moves the shutter 83 to open the lower end of the main body 81, and the optical element material 200 is supplied to the space S between molds in a non-contact state (supplying step).

The optical element material 200 supplied to the space S between molds is pressurized by the movable mold 21 and the fixed mold 31 as the cylinder 60 moves the movable mold unit 20 in a horizontal direction (pressurizing step).

The pressurizing step includes a first contacting step in which a movable mold 21 (first mold) is brought into contact with the optical element material 200, and a second contacting step in which a fixed mold 31 (second mold) is brought into contact with the optical element material 200 in and after the first contacting step.

The optical element material 200 which was pressurized in the pressurizing step is cooled, maintaining a state of being pressurized and retained until its temperature reaches a glass-transition point or below, for example by decreasing a temperature of heaters 22a and 32a, or by natural cooling (cooling step). After the cooling step, the optical element material 200 (manufactured optical element) is carried out from the device 1 for manufacturing an optical element by a not-illustrated carrying-out mechanism. As a result of the above, an optical element is manufactured.

Here, further detailed explanations are given for the supplying step and the pressuring step.

Figure 4:
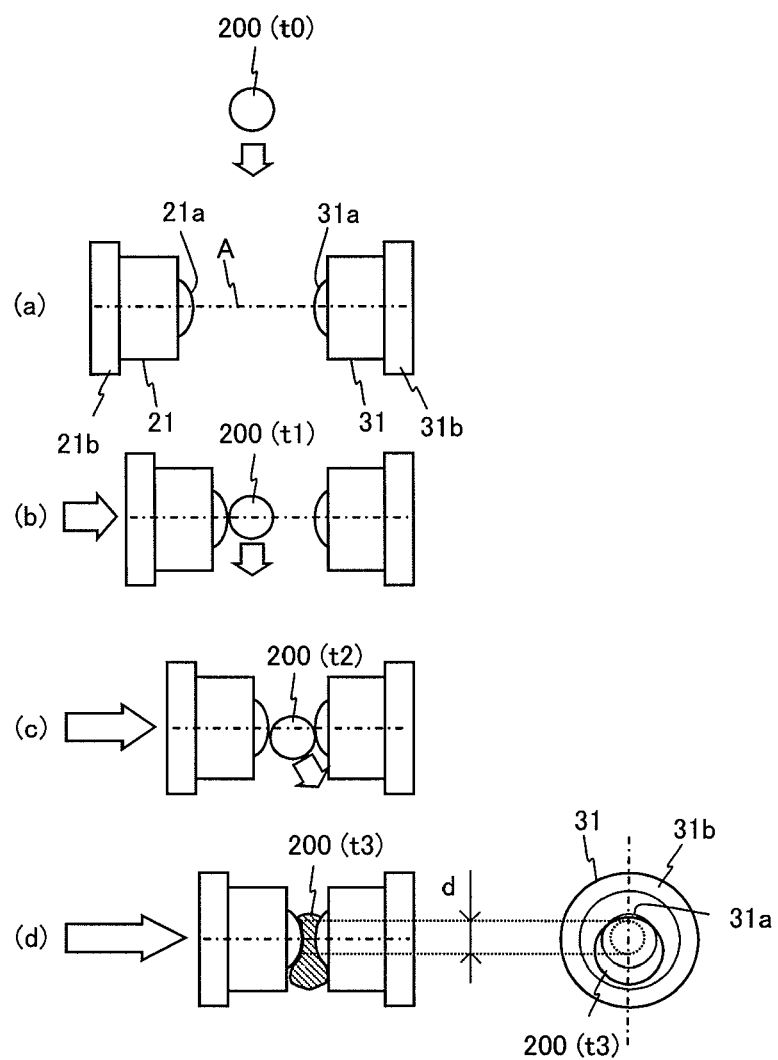
FIG. 4 is an explanatory diagram (No. 1) for explaining a supplying step and a pressurizing step of an optical element material in a third embodiment of the present invention.

The optical element material 200 (time t0) which starts a drop in the heating unit 80 as illustrated in FIG. 4 (a), in the first contacting step, comes into contact with the movable mold 21, as illustrated in FIG. 4(b) (optical element material 200 (time t1)).

Further, as illustrated in FIG. 4 (c), the optical element material 200 (time t2) comes into contact with the fixed mold 31 in the second contacting step. And as illustrated in FIG. 4(d), in the pressurizing step, a deformation of the optical element material 200 (time t3) commences.

Figure 5:
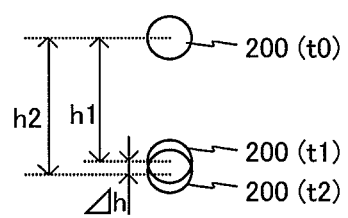
FIG. 5 is an explanatory diagram (No. 2) for explaining a supplying step and a pressurizing step of an optical element material in a third embodiment of the present invention.

As illustrated in FIG. 5, a height 1 and a time 1 after the optical element material 200 (time t0) starts a drop and up to the time it comes into contact with the movable mold 21 in the first contacting step, fulfill a relationship of "$h1=0.5 \times g$ (gravitational acceleration)$\times t1^2$".

Similarly, a height h2 and a time t2 after the optical element material 200 (time t0) starts a drop and up to the time it comes into contact with the fixed mold 31 in the second contacting step, fulfill a relationship of "$h2=0.5 \times g$ (gravitational acceleration)$\times t2^2$".

Further, when the optical element material 200 comes into contact with a center of a molding surface 21a of the movable mold 21, in order for the optical element material 200 to come into contact within an optical effective diameter d which is illustrated in FIG. 4 (d) of the molding surface 31a of the fixed mold 31, it is necessary that Δh, which is a difference between a height h2 and a height 1, fulfill "$\Delta h < 0.5 \times d$", and it is desirable that a time difference between a time t2 and a time t1 be set by considering this as well.

It is desirable that the above relationship be calculated by considering air resistance, an initial rate, a change in a falling track by a first contacting step, and the like, or that the above relationship be calculated by considering a supply by a parabolic track T as described in the first embodiment, and the like. Further, the above relationship may be obtained by measuring a movement of the optical element material 200.

As illustrated in FIG. 4 (d), in order for both the movable mold 21 and the fixed mold 31 to come into contact with the optical element material 200 after a deformation, with an entire optical effective diameter d, it is also necessary that a time starting from a completion of both first and second contacting steps and continuing up to a commencement of a deformation of the optical element material 200 be within an hour. Explanations are given for this in reference to FIG. 6.

Figure 6:
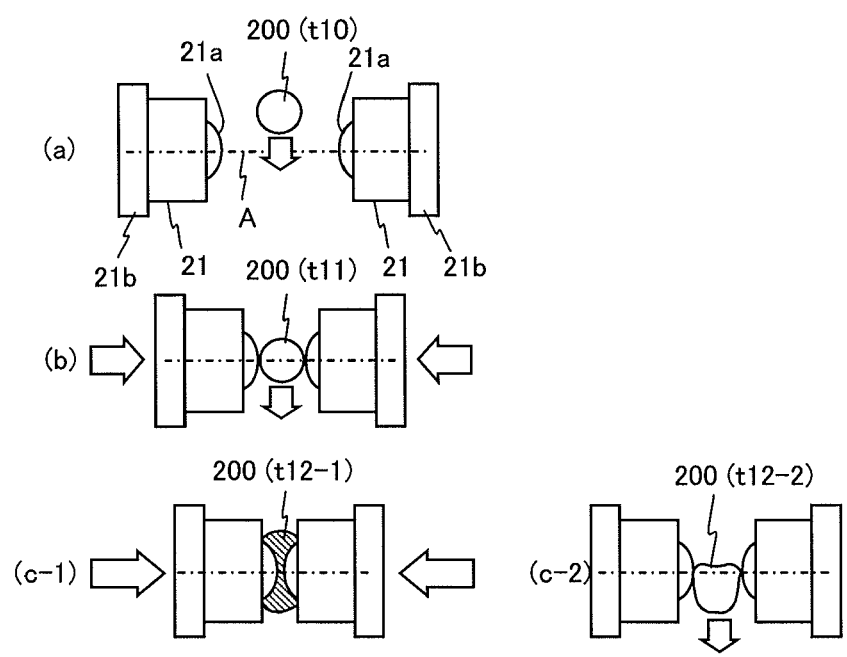
FIG. 6 is an explanatory diagram (No. 3) for explaining a supplying step and a pressurizing step of an optical element material in a third embodiment of the present invention.

Both first and second molds illustrated in FIG. 6 are movable molds 21 and explanations are given for the case when these molds come into contact with the optical element material 200 simultaneously.

The optical element material 200 (time t10) comes into contact with two movable molds 21 simultaneously as illustrated in FIG. 6 (a) and FIG. 6 (b) (time t11), and after that, by making the two movable molds 21 relatively closer as illustrated in FIG. 6 (c-1), both the movable mold 21 and the fixed mold 31 come into contact with the optical element material 200 after a deformation (time t12) with an entire optical effective diameter d similarly to what is illustrated in FIG. 4 (d). In this case, a relationship of "$\Delta h < 0.5 \times d$" is fulfilled as well.

On the other hand, when stopping two movable molds 21 after a contact with the optical element material 200 (time t11) as illustrated in FIG. 6 (c-2), the optical element material 200 goes slack due to a falling rate and a viscosity of the optical element material 200. Or when a friction between the optical element material 200 and two movable molds 21 is small, the optical element material 200 slips, causing a deviation in a position thereof. When the optical element material 200 goes slack or deviates in its position like this, similarly to when a contact position with the movable mold 21 is deviated, an outer diameter deflection of the optical element increases and a shape is no longer transferred to the optical element material 200 with an entire optical effective diameter d. As a result of this, an optical element becomes defective. The same applies to when the first mold is the movable mold 21 and the second mold is the fixed mold 31.

Therefore, it is preferable that a time starting from a completion of both first and second contacting steps and continuing up to a commencement of a deformation of the optical element material 200 and a moving rate of the movable mold 21 (deformation rate of the optical element material 200; in other words, a time up to the completion of a deformation of the optical element material 200, when a relative moving amount of the movable mold 21 and the fixed mold 31 molds in the pressurizing step is constant) and the like be determined, at least on the basis of a speed of the optical element material 200 just before the first contacting step (or, further, on the basis of, for example, a viscosity of the optical element material 200, a friction with first and second molds, and the like).

With regard to a determination of the time, it is also desirable to calculate it by considering air resistance and the like or to calculate it by considering a supply and the like by a parabolic track T as described in the first embodiment. Further, a determination of the time may also be obtained by measuring a slack or a slip of the optical element material 200.

In order to suppress an outer diameter deflection of the optical element, around the fixed mold 121 in the movable mold 111 (first mold) and the fixed mold 121 (second mold), outer diameter restriction rings 122 which restrict the outer diameter of the optical element material 200 in the pressuring step may be provided. The outer diameter restriction rings 122 may restrict a flow of the optical element material 200 in the pressuring step.

Figure 7:
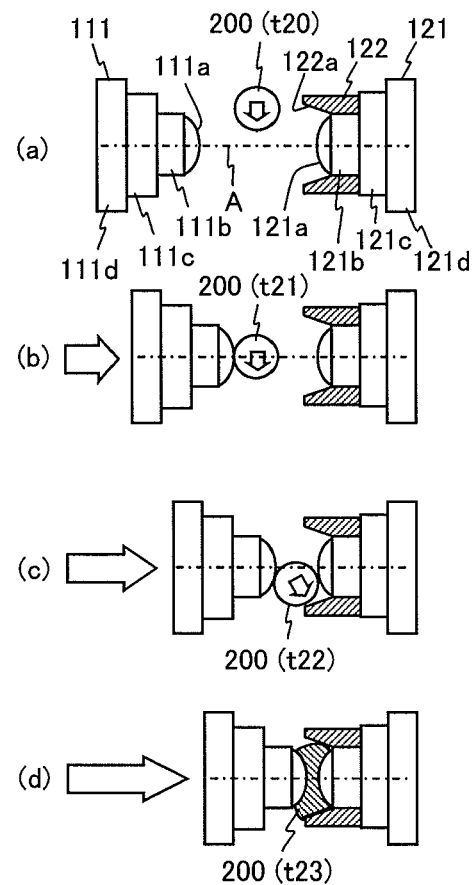
FIG. 7 is an explanatory diagram (No. 4) for explaining a supplying step and a pressurizing step of an optical element material in a third embodiment of the present invention.

As illustrated in FIG. 7, molding surfaces 111a and 121a of the movable mold 111 and the fixed mold 121 are formed on small-diameter units 111b and 121b. In the movable mold 111 and the fixed mold 121, small-diameter units 111b and 121b, medium-diameter units 111c and 121c, and large-diameter units 111d and 121d are formed in sequence.

Outer diameter restriction rings 122 are arranged around a small-diameter unit 121b of the fixed mold 121 and have a cylindrical shape. An inner diameter of a portion 122a of a tip end side of the outer diameter restriction ring 122 gradually becomes large as it approaches a tip end.

After the optical element material 200 (time t20) comes into contact with the movable mold 111 as illustrated in FIG. 7 (a) and FIG. 7 (b) (time t21), the optical element material 200 comes into contact with the fixed mold 121 as illustrated in FIG. 7 (c) (time t22), and is pressurized by the movable mold 111 and the fixed mold 121, as illustrated in FIG. 7 (d) (time t23).

At this time, a downward flow in FIG. 7 of the optical element material 200 is restricted by outer diameter restriction rings 122 and an upward flow is promoted. Accordingly, a position deviation amount as-is does not become an outer diameter deflection amount.

In the third embodiment explained so far above, the method for manufacturing the optical element includes a heating step which heats the optical element material 200 by suspending it in a gas. Further, the method for manufacturing the optical element includes a supplying step which supplies the heated optical element material 200 from a direction which intersects a central axis A which interconnects centers of a movable mold 21 (first mold) and a fixed mold 31 (second mold) to a space S between molds in a non-contact state.

Therefore, similarly to the first embodiment and the second embodiment, according to the present embodiment, restrictions in a molding condition may be reduced in heating the optical element material 200 by suspending it in a gas and supplying the heated optical element material 200 to the space S between molds.

In the first and second contacting steps of the present embodiment, the movable mold 21 and the fixed mold 31 come into contact with the optical element material 200 within a range of an optical effective diameter d. Accordingly, a deflection of an outer diameter of the optical element may be suppressed, and the optical element may be manufactured with a high degree of accuracy.

In addition, in the pressurizing step of the present embodiment, a time starting from a completion of both first and second contacting steps continuing up to a commencement of a deformation of the optical element material 200 and a moving rate of the movable mold 21 (deformation rate of the optical element material 200; that is, a time until a deformation of the optical element material 200 is completed, when a relative moving amount of the first and second molds in the pressurizing step is constant) are determined, at least on the basis of a speed of the optical element material 200 just before the first contacting step, so that the movable mold 21 and the fixed mold 31 come into contact with the optical element material 200 after a deformation with an entire optical effective diameter d of the movable mold 21 and the fixed mold 31. Accordingly, a deflection of an outer diameter of the optical element may be suppressed, and the optical element may be manufactured with a high degree of accuracy.

In addition, in the present embodiment, outer diameter restriction rings 122 which restrict a flow of the optical element material 200 are provided around a second mold (fixed mold 121 illustrated in FIG. 7). Accordingly, a deflection of an outer diameter of the optical element may be suppressed, and the optical element may be manufactured with a high degree of accuracy.

Further, in the present embodiment, a central axis A of the movable mold 21 and the fixed mold 31 is arranged orthogonally to a perpendicular direction. Accordingly, an interference of the movable mold 21 and the fixed mold 31 with the optical element material 200 in supplying the optical element material 200 from perpendicularly above (or perpendicularly below) to the space S between molds may be prevented.

Fourth Embodiment

Figure 8A:
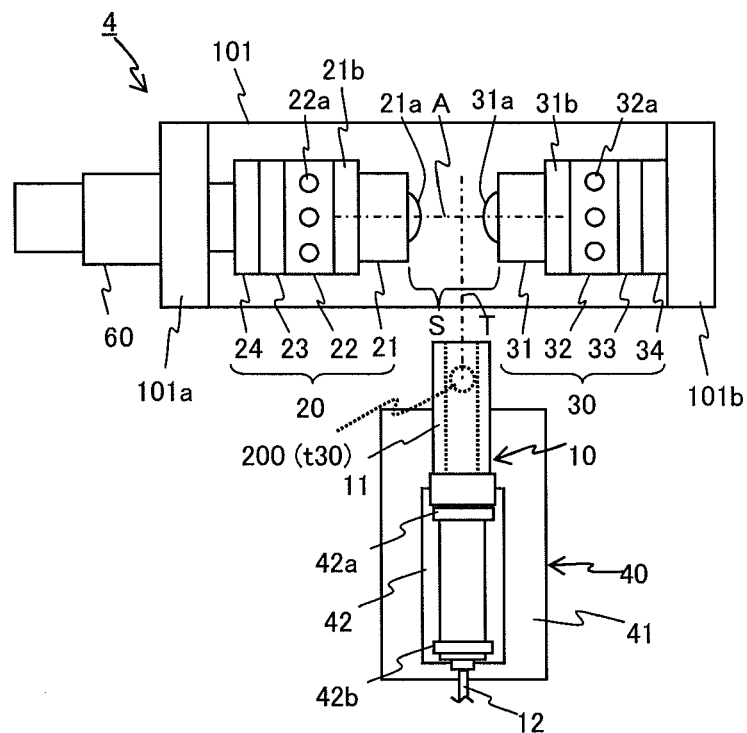
FIG. 8A is a front view (No. 1) which illustrates a device for manufacturing an optical element according to a fourth embodiment of the present invention.
Figure 8B:
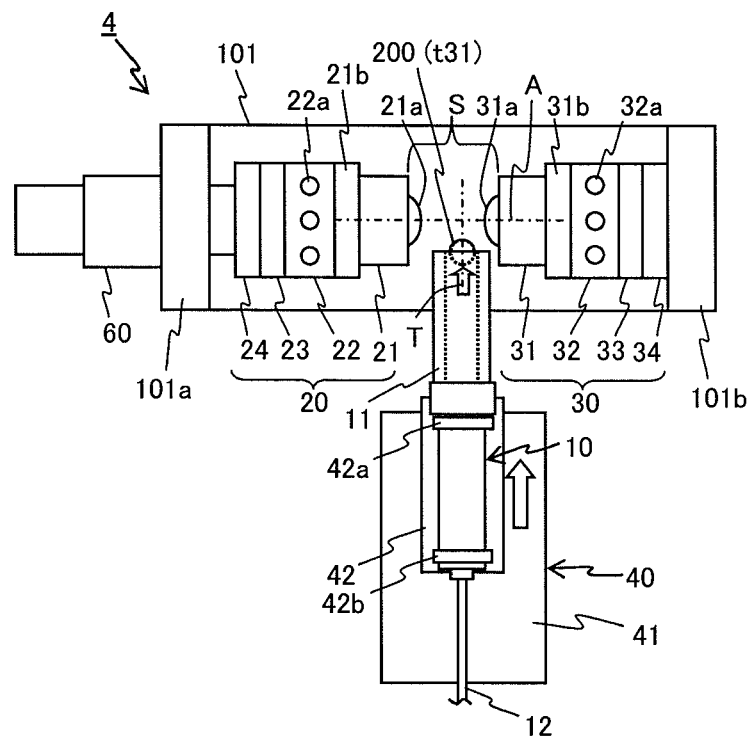
FIG. 8B is a front view (No. 2) which illustrates a device for manufacturing an optical element according to a fourth embodiment of the present invention.
Figure 8C:
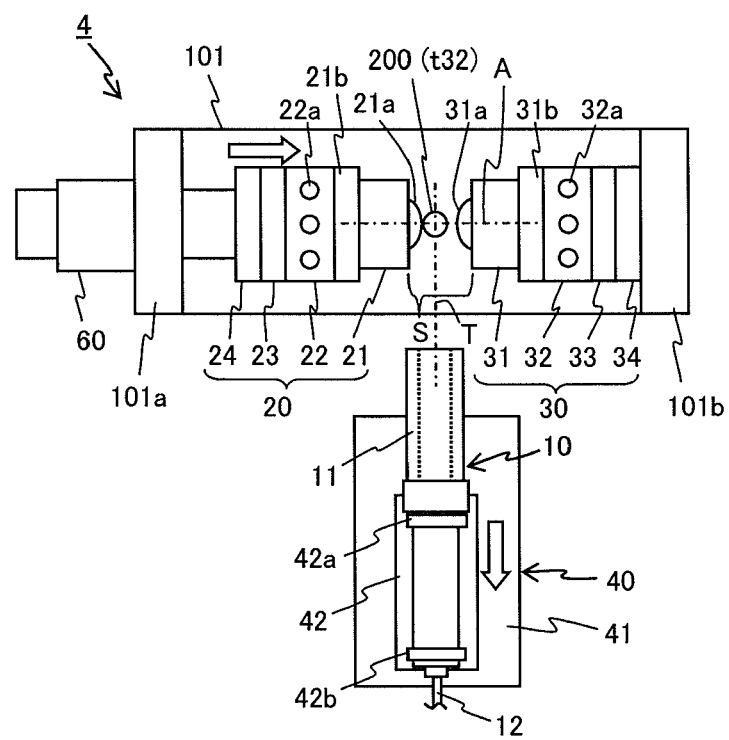
FIG. 8C is a front view (No. 3) which illustrates a device for manufacturing an optical element according to a fourth embodiment of the present invention.

Each of FIG. 8A to FIG. 8C is a front view which illustrates a device 4 for manufacturing an optical element according to a fourth embodiment of the present invention.

In the present embodiment, explanations are given mainly for matters that are different from the first embodiment to the third embodiment, and explanations are appropriately omitted for common matters.

As illustrated in FIG. 8A, and similarly to the third embodiment, the device 4 for manufacturing an optical element includes a movable mold unit 20, a fixed mold unit 30, a cylinder 60, and a mold fixing unit 101. The device 4 for manufacturing an optical element, similarly to the first embodiment, further includes a heating unit 10 and a heating unit moving mechanism 40.

A main body 11 of a heating unit 10 is arranged such that a top portion is opened perpendicularly upward.

A heating unit moving mechanism 40 is arranged such that a heating unit 10 is movable to both perpendicularly upward and perpendicularly downward.

Next, explanations are given for a flow of manufacturing the optical element from the optical element material 200.

In the heating unit 10, a gas to be supplied inside of the main body 11 through the gas supply pipe 12 is heated, and the heated gas is sprayed to the optical element material 200. Thus, the heating unit 10 heats the optical element material 200 by suspending it in a gas inside of the main body 11 (heating step).

In the present embodiment, the heated optical element material 200 is supplied from perpendicularly below to a space S between molds, a direction which intersects a central axis A (horizontal direction) of the movable mold 21 and the fixed mold 31 in a non-contact state (supplying step).

In the supplying step of the present embodiment, the optical element material 200 is supplied to the space S between molds, being positioned inside of the heating unit 10, as illustrated in FIG. 8B, and then it is discharged from the heating unit 10. However, in order to avoid interference with the movable mold 21 and the fixed mold 31, it is preferable that the heating unit 10 go into the space S between molds such that it does not reach a central axis A of the movable mold 21 and the fixed mold 31.

Further, in the supplying step, it is preferable that the optical element material 200 be discharged from the heating unit 10 by inertia by stopping or decelerating while the optical element material 200 is moving perpendicularly upward, or that the optical element material 200 be discharged by increasing a spraying amount (flow rate) of a gas. Then, as illustrated in FIG. 8C, the heating unit 10 may rapidly descend perpendicularly downward so as to not interfere with the movable mold 21 and the fixed mold 31.

The optical element material 200 supplied to the space S between molds is pressurized by the movable mold 21 and the fixed mold 31 as the cylinder 60 moves the movable mold unit 20 in a horizontal direction (pressurizing step).

The pressurizing step includes a first contacting step in which a movable mold 21 (first mold) is brought into contact with the optical element material 200, and a second contacting step in which a fixed mold 31 (second mold) is brought into contact with the optical element material 200 in and after the first contacting step.

The optical element material 200 which was pressurized in the pressurizing step is cooled, maintaining a state of being pressurized, and retained until its temperature reaches a glass-transition point or below, for example, by decreasing a temperature of the heaters 22a and 32a, or by natural cooling (cooling step). After the cooling step, the optical element material 200 (manufactured optical element) is carried out from the device 1 for manufacturing an optical element by a not-illustrated carrying-out mechanism. As a result of the above, an optical element is manufactured.

Here, further detailed explanations are given for the supplying step and the pressuring step.

As illustrated in FIG. 9 (a), the optical element material 200 (time t30) which starts a movement perpendicularly upward in the heating unit 10 comes into contact with the movable mold 21 (optical element material 200 (time t31)) in the first contacting step, as illustrated in FIG. 9 (b). At this time, the movable mold 21 comes into contact with the optical element material 200 at a top position.

Figure 10:
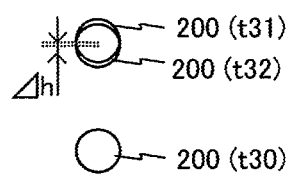
FIG. 10 is an explanatory diagram (No. 2) for explaining a supplying step and a pressurizing step of an optical element material in a fourth embodiment of the present invention.

Accordingly, when the optical element material 200 (time t32) comes into contact with the fixed mold 31 in the second contacting step as illustrated in FIG. 9 (c), a dropping distance from the optical element material 200 (time t31) of the first contacting step is small as illustrated in FIG. 10, and therefore, a position deviation is unlikely to occur.

When the movable mold 21 comes into contact with the optical element material 200, which is along the path of ascending in the first contacting step, since an upward energy remains in the optical element material 200, the optical element material 200 does not drop even after it comes into contact with the movable mold 21. Therefore, as the optical element material 200 and the fixed mold 31 are in contact with each other until a dropping commences, a position deviation is unlikely to occur.

In the fourth embodiment explained so far above, the method for manufacturing the optical element includes a heating step which heats the optical element material 200 by suspending it in a gas. Further, the method for manufacturing the optical element includes a supplying step which supplies the heated optical element material 200 from a direction which intersects a central axis A which interconnects centers of a movable mold 21 (first mold) and a fixed mold 31 (second mold) to a space S between molds in a non-contact state.

Therefore, similarly to the first embodiment to the third embodiment, according to the present embodiment, restrictions in a molding condition may be reduced in heating the optical element material 200 by suspending it in a gas and supplying the heated optical element material 200 to the space S between molds.

Further, in the supplying step of the present embodiment, the optical element material 200 is supplied to the space S between molds, being positioned inside of the heating unit 10, and then it is discharged from the heating unit 10. Therefore, the optical element material 200 may be reliably supplied to a prescribed position, and as a result, a position deviation of the optical element material 200 may be prevented.

What is claimed is:

1. A method for manufacturing an optical element using first and second molds and a heater, the first and second molds being initially spaced apart to define a space there between, a central axis extending through the center of the first and second molds, the method comprising:
   heating an optical element material by suspending it in a gas inside the heater;
   moving the heater into the space between the first and second molds but stopping the heater before it reaches the central axis;
   ejecting the heated optical element material from the heater in a direction which intersects the central axis such that the heated optical element material arrives in the space in a non-contact state;
   using the first and second molds to pressurize the heated optical element material located in the space; and
   cooling the pressurized, heated optical element material.

2. The method for manufacturing an optical element according to claim 1, wherein the pressurizing of the optical element material includes:
   a first contacting which brings the first mold into contact with the heated optical element material; and
   a second contacting which brings the second mold into contact with the heated optical element material during or after the first contacting, and
   the first and second molds being brought into contact with the heated optical element material within a range of an optical effective diameter of the first and second molds.

3. The method for manufacturing an optical element according to claim 2, wherein the pressurizing of the optical element material includes determining a time and a deformation rate starting from a completion of both the first contacting and second contacting and up to a commencement of a deformation of the optical element material, at least on the basis of a speed of the optical element material just before the first contacting so that the first mold and the second mold come into contact with the optical element material after a deformation with an entire optical effective diameter.

4. The method for manufacturing an optical element according to claim 2, wherein:
   the heated optical element material is ejected from the heater from a position below the space so that the heated optical element material is ejected in an upwardly path along a trajectory; and
   the first contacting brings the first mold into contact with the heated optical element material either when the heated optical element reaches a topmost position of its trajectory or is ascending towards its topmost position.

5. The method for manufacturing an optical element according to claim 1, wherein the heated optical element material is ejected from the heater along a trajectory which is perpendicular to the central axis.

6. The method for manufacturing an optical element according to claim 5, wherein the optical element material is ejected from the heater from a position above the space.

7. The method for manufacturing an optical element according to claim 5, wherein the optical element material is ejected from the heater from a position below the space.

8. The method for manufacturing an optical element according to claim 1, wherein the heated optical element material is ejected from the heater by inertia.

9. The method for manufacturing an optical element according to claim 8, wherein the inertia is created by movement of the heater.

10. The method for manufacturing an optical element according to claim 1, wherein an outer diameter restriction ring which restricts an outer diameter of the heated optical element material when the first and second molds pressurize the heated optical element material is provided around the second mold.

* * * * *